April 2, 1968  K. R. BULLOCK  3,376,378
COMMUNICATION CABLE
Filed Aug. 2, 1965
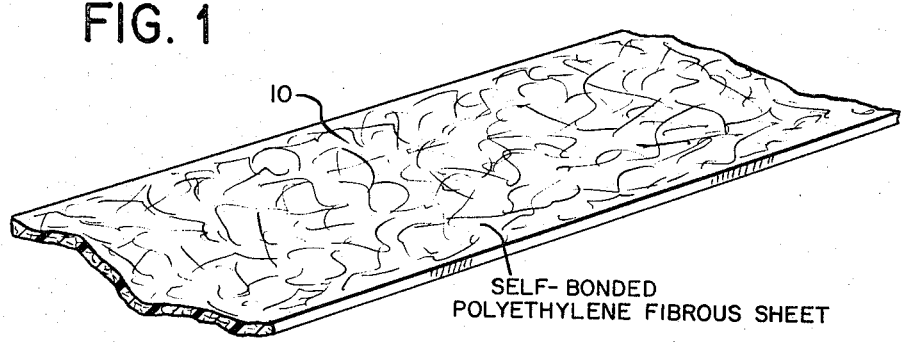
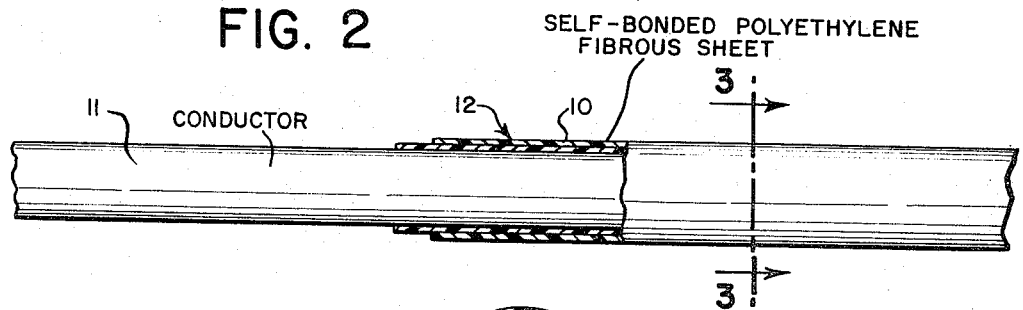
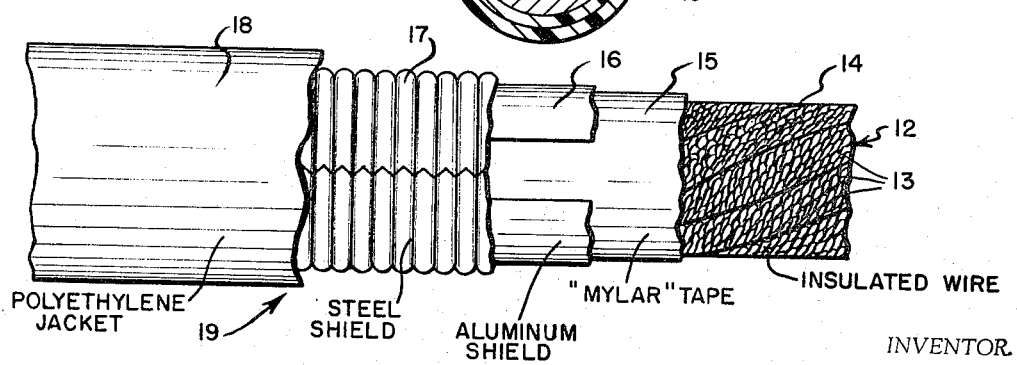
INVENTOR.
Kenneth R. Bullock
BY
ATTORNEYS

United States Patent Office 3,376,378
Patented Apr. 2, 1968

3,376,378
COMMUNICATION CABLE
Kenneth R. Bullock, Sycamore, Ill., assignor to Anaconda Wire and Cable Company, New York, N.Y., a corporation of Delaware
Filed Aug. 2, 1965, Ser. No. 476,328
3 Claims. (Cl. 174—107)

This invention relates to cables and, more particularly, to a new insulation covering for an electrical conductor of said cable. The invention is based on the discovery that when an electrical conductor is insulated by a sheet of self-bonded randomly distributed polyethylene fibers, the resultant cable made up of a plurality of these insulated conductors possesses desirable characteristics particularly suitable in telecommunication such as for telephone cables.

Broadly stated, the cable of this invention comprises at least one electrical conductor and an insulation covering thereon. The covering is a sheet of self-bonded continuous lengths of a substantially linear polyethylene fiber randomly distributed in multi-directional overlapping and intersecting arrangement through the sheet to provide a sheet density greater than about 7 lbs./ft.$^3$ and a tensile strength above 0.3 lb./in.//oz./yd.$^2$. Preferably, the fiber is less than above 4 microns in thickness.

The insulation covering for the present invention is made from linear polyethylene in the form of an integral network of primarily ribbon-like fibers which have cross sections varying along the length of the fibers. These fibers may be incorporated into the sheet structure in a direct laid-down process in which the fibers issuing from the spinnerette are spun directly onto a moving belt to form a loose sheet wherein the fibers are laid one on top of the other in overlapping multi-directional intersecting patterns. The loose sheet is then compacted by calendering to the desired thickness. The final product in sheet form is a material ranging from soft fabric-like to stronger paper-like sheets. It is chemical, moisture, oil, and grease resistant and has excellent dimensional stability. Its melting point is about 135° C. and remains flexible at temperatures as low as −116° C. Some properties of two typical sheets of self-bonded polyethylene fibers, one is paper-like and the other fabric-like material, are listed in Tables 1 and 2, as follows:

TABLE 1.—PHYSICAL PROPERTIES PAPER-LIKE SHEET

| Basis Weight (Oz./Yd.$^2$) | 1.5 | 2.0 |
|---|---|---|
| Thickness (Mils) | 4–5 | 6–8 |
| Elmendorf Tear (Lbs.) | 0. 6/0. 6 | 0. 8/0. 8 |
| Strip Tensile (Lbs./In.) | 33. 0/31. 0 | 47. 0/40. 0 |
| Elongation (Percent) | 17. 1/22. 3 | 18. 0/23. 0 |
| MIT Flex (Cycles) | >20M | 20M |

TABLE 2.—PHYSICAL PROPERTIES FABRIC-LIKE SHEET

| Basis Weight (Oz./Yd.$^2$), Nominal | 1.0 | 1.5 | 2.0 |
|---|---|---|---|
| Thickness (Mils) | 5, 2 | 8.8 | 12. 5 |
| Strip Tensile (Lbs./In.) | 7. 6/7. 2 | 12. 0/11. 5 | 17. 0/43. 0 |
| Elongation to Break (Percent) | 25. 0/28. 0 | 27. 0/32. 0 | 31. 0/43. 0 |
| Grab Tensile (Lbs.) | 20. 0/18. 0 | 27. 0/26. 0 | 50. 0/40. 0 |
| Tongue Tear (Lbs.) | 2. 7/2. 6 | 3. 2/3. 0 | 5. 5/5. 3 |

When electrical conductors insulated in accordance with the teaching of this invention are used in a communication cable consisting of a plurality of pairs of insulated wires, the mutual capacitance is less than 0.83 μf./mile at 1000 c.p.s. for a sheet less than 4 mils in thickness. The dielectric constant of the polyethylene material suitable for the present invention is less than 2.0 and preferably lower. Depending on the polymeric structures and other factors of the fibrous sheet, the dielectric constant of self-bonded polyethylene fibers can be as low as 1.0 and the mutual capacitance less than 0.83 μf./mile at a thickness less than 1.4 mils.

In the manufacturing of insulated electrical wires in accordance with this invention, a single strip of paper-like self-bonded polyethylene fibrous sheet is wrapped helically around the electrical conductor to serve as insulation. Alternatively, the strip of insulation may be applied around the conductor in a manner so as to provide a longitudinal wrap. In the latter method, we prefer to use a wire covering and tube forming die as disclosed in the copending application Ser. No. 383,335, filed July 17, 1964, by Harvey Burr, and assigned to the same assignee as the present invention, to manufacture insulated electrical wires. The resultant insulated wires are then used to make up a standard communication cable.

Further to illustrate this invention, a specific example is described hereinbelow with reference to the accompanying drawings wherein FIG. 1 is an isometric view of a fragmentary strip of self-bonded polyethylene fibrous sheet, FIG. 2 is a side view partially in section of an insulated electrical wire, FIG. 3 is an enlarged cross section through line 4—4 of FIG. 2, and FIG. 4 is a side view of a communication cable of this invention with layers partially removed to show its construction.

Referring to the drawings, the insulation sheet 10 of FIG. 1 is a paper-like product made of 100% linear polyethylene fibers. It has a nominal thickness of 3 to 4 mils and a basis weight of 1.0 oz./yd.$^2$. In FIG. 2, the sheet 10 is pre-slit to $^{15}\!/_{32}$ in. tape and is applied on a 19 AWG copper wire 11 with left-hand lay 15 to 20 wraps per foot to form an insulation 12 which has a cross section as shown in FIG. 3. The insulated wires 12 are used for manufacturing telephone cable.

With reference to FIG. 4, the insulated wires 12 are first twisted into pairs 13. 26 pairs then form the core 14. The twining is right-hand lay with a lay length of 2.7 to 5.5 inches. The core is covered with a GRS-Mylar tape 15. A noncorrugated aluminum shield 16 and a corrugated steel shield 17, flooded with a corrosion resistant compound, are in turn placed over the cover 15. A low density polyethylene jacket 18 is then extruded over the corrugated steel shield 17 to form a standard Stalpeth cable 19. The finished Stalpeth cable 19 and the insulated wire 12 are subject to routine mill tests using standard test procedures. The electrical measurements of the cable and the wire were also made using standard measurement procedures as follows:

| Results: | Test Method |
|---|---|
| Primary and secondary parameters at 1000 c.p.s. | Open-circuit and short-circuit impedance measurements on full reel at 1000 c.p.s. |
| Primary and secondary parameters at carrier frequencies. | Open-circuit and short-circuit impedance measurements on 30 foot sample at carrier frequencies. |
| Physical make-up of core | Open-circuit and short-circuit impedance measurements and capacitance from each pair to ground at 1000 c.p.s. |
| Far-end crosstalk coupling loss. | Insertion loss method. |
| Dielectric strength | Voltage applied from each conductor to all other conductors and shield grounded on 10-foot sample. |

Dielectric constant of the spunbonded material was determined from measurements of coaxial capacitance and dimensions on a 30-ft. single conductor, 19 AWG with self-bonded polyethylene tape applied helically, by hand, and covered with an aluminum backed shield.

For the purpose of comparison, a standard Stalpeth, 26 pair, 19 AWG telephone cable containing paper insulated electrical conductors was similarly tested. The results of these tests and the physical make-up are shown in the following Tables 3 to 7:

TABLE 3.—PHYSICAL MAKEUP OF CABLES AS DETERMINED FROM ELECTRICAL AND PHYSICAL MEASUREMENTS ON FINISHED SAMPLES

|  | Self-Bonded Polyethylene | Paper Insulated |
|---|---|---|
| Wire Diameter: |  |  |
| Min., mils | 35.99 | 35.75 |
| Avg., mils | 36.13 | 35.98 |
| Max., mils | 36.28 | 36.16 |
| Wire Insulation: |  |  |
| Width, in | ~0.5 | 7/16 |
| Thickness, mils | ~3 | 4 |
| Inter Axial Spacing: |  |  |
| Min., mils | 54.56 | 56.46 |
| Avg., mils | 56.09 | 58.06 |
| Max., mils | 58.15 | 59.88 |
| Pair Space: |  |  |
| Min., KCM | 9.97 | 10.68 |
| Avg., KCM | 10.54 | 11.30 |
| Max., KCM | 11.32 | 12.01 |
| Core Diameter, in | 0.523 | 0.542 |
| Diameter under Shield over GRS tape, in | 0.627 | -------- |
| Diameter under Shield over paper tape, in | -------- | 0.610 |
| Diameter over Shield, in | 0.735 | 0.727 |
| Over-all Diameter, in | 0.811 | 0.823 |

TABLE 4.—ELECTRICAL CHARACTERISTICS

|  | Poly Spun | Paper |
|---|---|---|
| Mutual Capacitance at 1,000 c.p.s. in μf./Mi.: |  |  |
| Min | .0708 | .0799 |
| Avg | .0750 | .0825 |
| Max | .0793 | .0865 |
| Stand. Dev | .00195 | .00172 |
| Reference Transverse Deviation | 2.60 | 2.08 |
| Loop Resistance in Ohms/Mi.: |  |  |
| Min | 83.16 | 83.70 |
| Avg | 83.87 | 84.57 |
| Max | 84.52 | 85.65 |
| Stand. Dev | .423 | .508 |
| Dielectric Constant: |  |  |
| Material | 1.54 | 1.8-2.6 |
| Avg. Effective | 1.30 | 1.58 |
| Far-End Crosstalk at 150 Kc./S. Db/1,000 Ft.: |  |  |
| Rms | 75.4 | 77.2 |
| Min | 54.0 | 60.0 |
| Avg | 90.1 | 88.9 |
| Capacitance Unbalance at 1,000 c.p.s. in Pf/Length: |  |  |
| Pair-Pair: |  |  |
| Avg | 9.4 | 12.1 |
| Rms | 23.7 | 28.0 |
| Max | 148.0 | 182.0 |
| Min | .0 | .0 |
| Pair-Shield: |  |  |
| Avg | 460 | 443 |
| Rms | 631 | 811 |
| Max | 1,791 | 2,239 |
| Min | 54 | 0 |
| Dielectric Strength: |  |  |
| Min | 1,250 | 1,750 |
| Avg | 3,700 | 3,250 |
| Max | 6,000 | 5,000 |
| Rms | 3,900 | 3,440 |
| Stand. Dev | 1,665 | 975 |

TABLE 5.—PRIMARY AND SECONDARY PARAMETERS FROM BRIDGE READINGS

FREQ=Frequency, cycles per second
R=Resistance, Ohms per mile at 68° F.
L=Inductance, Millihenries per mile
G=Conductance, Micromhos per mile
C=Capacitance, Microfarads per mile
ZOM=Characteristic impedance, magnitude in Ohms
ZOA=Characteristic impedance, angle in degrees
A=Attenuation, DB per mile
B=Phase constant, radians per mile
VEL=Velocity of propagation, miles/sec.

[26 PR 19 AWG Stalpeth self-bonded polyethylene cable. 26 pairs of 30.0 ft. at 76.0° F., Code 51]

| FREQ | R | L | G | C | ZOM | ZOA | A | B | VEL |
|---|---|---|---|---|---|---|---|---|---|
| 1000 | 83.3 | .880 | .16 | .0751 | 424.3 | −43.1 | 1.18 | .146 | 42986 |
| 2000 | 83.3 | .880 | .33 | .0749 | 301.3 | −41.2 | 1.62 | .213 | 58915 |
| 5000 | 83.8 | .862 | .49 | .0749 | 195.0 | −36.1 | 2.35 | .370 | 84776 |
| 10000 | 85.1 | .862 | .30 | .0749 | 147.2 | −28.9 | 2.91 | .606 | 103549 |
| 20000 | 89.2 | .844 | 1.09 | .0749 | 121.8 | −20.2 | 3.45 | 1.075 | 116795 |
| 30000 | 94.2 | .827 | 2.33 | .0749 | 113.8 | −15.7 | 3.80 | 1.547 | 121802 |
| 50000 | 106.7 | .809 | 4.94 | .0751 | 108.2 | −11.5 | 4.44 | 2.502 | 125521 |
| 80000 | 126.0 | .774 | 9.04 | .0751 | 104.1 | −9.1 | 5.41 | 3.883 | 129426 |
| 90000 | 132.4 | .774 | 12.06 | .0751 | 103.8 | −8.5 | 5.70 | 4.362 | 129626 |
| 100000 | 139.1 | .774 | 14.13 | .0751 | 103.6 | −8.1 | 6.00 | 4.840 | 129793 |
| 150000 | 167.0 | .738 | 26.31 | .0751 | 100.6 | −6.8 | 7.40 | 7.071 | 133275 |
| 200000 | 191.8 | .703 | 42.34 | .0750 | 97.9 | −6.2 | 8.72 | 9.186 | 136790 |
| 300000 | 232.2 | .685 | 88.98 | .0750 | 96.3 | −5.1 | 10.73 | 13.566 | 138933 |
| 400000 | 266.2 | .666 | 151.24 | .0750 | 94.8 | −4.5 | 12.50 | 17.835 | 140910 |
| 500000 | 296.5 | .665 | 211.45 | .0749 | 94.7 | −4.0 | 13.95 | 22.237 | 141270 |
| 600000 | 322.7 | .646 | 312.67 | .0749 | 93.2 | −3.8 | 15.44 | 26.297 | 143351 |
| 700000 | 347.7 | .644 | 392.95 | .0749 | 93.1 | −3.5 | 16.69 | 30.624 | 143612 |
| 800000 | 371.5 | .642 | 536.85 | .0748 | 92.9 | −3.2 | 17.90 | 34.925 | 143919 |
| 900000 | 395.7 | .640 | 675.57 | .0747 | 92.8 | −3.1 | 19.13 | 39.194 | 144274 |
| 1000000 | 414.5 | .638 | 802.22 | .0748 | 92.5 | −2.9 | 20.13 | 43.473 | 144525 |

TABLE 6.—PRIMARY AND SECONDARY PARAMETERS FROM BRIDGE READINGS

[26 PR 19 AWG Stalpeth soft paper insulated cable 26 pairs of 30.0 ft. at 75.0° F.]

| FREQ | R | L | G | C | ZOM | ZOA | A | B | VEL |
|---|---|---|---|---|---|---|---|---|---|
| 1000 | 83.0 | .933 | 1.75 | .0844 | 399.0 | −42.9 | 1.25 | .154 | 40633 |
| 2000 | 83.2 | .915 | 2.62 | .0844 | 283.4 | −41.0 | 1.72 | .226 | 55509 |
| 5000 | 84.0 | .915 | 7.88 | .0843 | 184.4 | −35.6 | 2.48 | .396 | 79283 |
| 10000 | 85.9 | .897 | 20.73 | .0841 | 140.2 | −28.4 | 3.08 | .650 | 96625 |
| 20000 | 90.4 | .862 | 50.54 | .0841 | 115.9 | −20.0 | 3.68 | 1.149 | 109315 |
| 30000 | 95.1 | .844 | 90.32 | .0839 | 108.4 | −15.4 | 4.05 | 1.651 | 114098 |
| 50000 | 105.9 | .827 | 185.65 | .0837 | 103.3 | −11.0 | 4.68 | 2.666 | 117819 |
| 80000 | 123.5 | .809 | 350.36 | .0837 | 100.5 | −8.3 | 5.62 | 4.184 | 120133 |
| 90000 | 129.0 | .791 | 411.94 | .0835 | 99.3 | −7.9 | 5.96 | 4.645 | 121727 |
| 100000 | 134.9 | .791 | 472.56 | .0835 | 99.1 | −7.4 | 6.25 | 5.155 | 121872 |
| 150000 | 161.8 | .756 | 818.35 | .0833 | 96.4 | −6.1 | 7.78 | 7.528 | 125181 |
| 200000 | 185.0 | .738 | 1195.73 | .0833 | 95.0 | −5.3 | 9.11 | 9.902 | 126901 |
| 300000 | 222.7 | .720 | 2038.54 | .0828 | 93.8 | −4.3 | 11.32 | 14.603 | 129072 |
| 400000 | 254.9 | .701 | 2966.51 | .0827 | 92.5 | −3.7 | 13.36 | 19.186 | 130988 |
| 500000 | 282.6 | .699 | 3953.42 | .0825 | 92.4 | −3.2 | 15.09 | 23.917 | 131344 |
| 600000 | 309.2 | .680 | 4987.11 | .0823 | 91.2 | −3.0 | 16.94 | 28.264 | 133375 |
| 700000 | 333.8 | .678 | 6065.16 | .0822 | 91.0 | −2.7 | 18.58 | 32.901 | 133675 |
| 800000 | 357.7 | .676 | 7195.77 | .0821 | 90.9 | −2.5 | 20.20 | 37.502 | 134028 |
| 900000 | 376.5 | .673 | 8385.38 | .0818 | 90.9 | −2.3 | 21.58 | 42.018 | 134577 |
| 1000000 | 396.2 | .670 | 9638.43 | .0818 | 90.7 | −2.1 | 23.07 | 46.572 | 134906 |

TABLE 7.—RESULTS OF MILL TESTS FOR SELF-BONDED POLYETHYLENE STALPETH CABLE

| Test | Result | Spec. |
|---|---|---|
| Conductor and Shield Continuity. | OK | |
| High Voltage C-C | Passed | 500 V.A.C., 2 Sec. |
| High Voltage C-G | do | 1,000 V.A.C., 2 Sec. |
| Shield Resistance | 0.81 | 1.350 ohms/1,000 ft. max. |
| Insulation Resistance | 26,700 | 1,000 meg. min. |
| Average Mutual Capacitance. | 0.0760 μf/mile | |

The test results indicate that the average effect of the dielectric constant of the finished cable with the self-bonded polyethylene fibrous insulation is about 81.6% nominal value occurring in a cable with paper insulation and exhibits a negligible variation over the frequency range from 1 kc./s. to 1 mc./s. The conductance characteristic of this new insulation covering is considerably better than that of paper insulated cables. The better conductance characteristic leads to lower attenuation at carrier frequencies. We found that the strength of the self-bonded ethylene tape is adequate since no breaks occur during manufacture and no shiners were evident in the finished sample.

The lower relative dielectric constant of the self-bonded polyethylene tape, as compared to that of paper, permits an estimated reduction in insulation thickness of 20% to 30%, respectively, for 19 and 24 AWG cables from the paper thickness presently employed. The corresponding reductions by weight due to lower density of the self-bonded polyethylene material are above 65% and 66%, respectively. This, in turn, results in a decrease of 13% to 15% in over-all diameter in all pair counts as shown in Table 8:

TABLE 8.—COMPARISON OF REQUIREMENTS FOR CABLES WITH SPUNBONDED POLYETHYLENE AND PAPER INSULATION TO ACHIEVE A MUTUAL CAPACITANCE OF 0.083 μf/mile

| AWG | Insulation | Paper | SBPE | Percent Reduction |
|---|---|---|---|---|
| 19 | Thickness, mils | 3.5 | 2.8 | 20. |
| | Wt./Conductor, lb./1000 ft | 0.512 | 0.232 | 54.7 |
| 24 | Thickness, mils | 2.0 | 1.4 | 30 |
| | Wt./Conductor, lb./1000 ft | 0.162 | 0.055 | 66 |

| | Core Diameter, Inches | | | |
|---|---|---|---|---|
| AWG | Pair Count | Paper | SBPE | Percent Reduction |
| 19 | 25 | 0.550 | 0.476 | 13.6 |
| | 100 | 1.110 | .952 | 14.2 |
| | 400 | 2.210 | 1.905 | 13.8 |
| 24 | 25 | 0.310 | 0.265 | 14.5 |
| | 100 | .620 | .530 | 14.5 |
| | 400 | 1.23 | 1.06 | 13.8 |

While the above example uses a helically wound insulation on the conductor, similar results are obtained when the cable is insulated with a longitudinally wrapped insulation. This type of insulation has its edge extending substantially parallel to the conductor. Preferably, it has a substantial longitudinal overlap around the wire so as to avoid a bare spot during the subsequent bending and twining operations. Using the die disclosed by Burr's copending application as previously identified, the insulation sheet can provide about 2 wraps around the conductor in a continuous process in which an advancing conductor is longitudinally wrapped with the insulation sheet. The self-bonded polyethylene fibrous sheet is particularly advantageous for use in Burr's die because of its substantially uniform thickness, high tensile strength, and inherent plastic properties. For example, the temperature of the die, which must be high when paper insulation is used for molding the insulation to the conductor, can be substantially lower for the polyethylene sheet and the resultant insulation wire using the polyethylene sheet has less tendency to warp at its edge and to open when it is bent. The longitudinally wrapped wire which comes out from the die can be immediately twisted into pairs.

I claim:

1. A communication cable comprising a plurality of pairs of insulated wires, at least one metallic shield protecting said wires and an outer resinous plastic jacket covering said shield, each of said wires comprising an electrical conductor and an insulation having a thickness of 3 to 4 mils thereon, said covering being a sheet in web form of self-bonded continuous lengths of a substantially linear polyethylene fiber in multi-directional overlapping and interacting arrangement throughout said sheet providing a sheet density greater than about 7 lbs./ft.$^3$ and a tensile strength above 0.3 lb./in.//oz./yd.$^2$, a dielectric constant less than about 2.0 and a mutual capacitance less than 0.83 μf./mile at 1000 c.p.s. for a sheet 3 to 4 mils in thickness, and said fiber being less than about 4 microns in thickness.

2. A communication cable as in claim 1 wherein said sheet is helically wound on said conductor providing said insulation covering.

3. A communication cable as in claim 1 wherein said sheet is longitudinally wrapped around said conductor providing said insulation covering.

References Cited

UNITED STATES PATENTS

| 2,589,700 | 3/1952 | Johnstone | 174—106 |
| 2,952,728 | 9/1960 | Yokose | 174—120 X |
| 3,077,510 | 2/1963 | Olds | 174—120 X |
| 3,186,897 | 6/1965 | Hochberg | 161—150 |

FOREIGN PATENTS

| 574,562 | 4/1959 | Canada. |
| 932,482 | 7/1963 | Great Britain. |
| 993,920 | 6/1965 | Great Britain. |

DARRELL L. CLAY, *Primary Examiner.*

H. HUBERFELD, A. T. GRIMLEY,
*Assistant Examiners.*